United States Patent
Pan et al.

(10) Patent No.: US 12,054,673 B2
(45) Date of Patent: Aug. 6, 2024

(54) GREEN RESOURCE-GENERATING METHOD BASED ON THERMAL MASS SYNERGY OF WASTE INTEGRATED CIRCUIT BOARD

(71) Applicant: Beijing University of Technology, Beijing (CN)

(72) Inventors: Dean Pan, Beijing (CN); Yufeng Wu, Beijing (CN); Tieyong Zuo, Beijing (CN)

(73) Assignee: BEIJING UNIVERSITY OF TECHNOLOGY, Beijing (CN)

( * ) Notice: Subject to any disclaimer, the term of this patent is extended or adjusted under 35 U.S.C. 154(b) by 753 days.

(21) Appl. No.: 16/333,591

(22) PCT Filed: May 28, 2018

(86) PCT No.: PCT/CN2018/088704
§ 371 (c)(1),
(2) Date: Dec. 23, 2021

(87) PCT Pub. No.: WO2019/114199
PCT Pub. Date: Jun. 20, 2019

(65) Prior Publication Data
US 2022/0119714 A1    Apr. 21, 2022

(30) Foreign Application Priority Data
Dec. 14, 2017   (CN) .......................... 201711338103.9

(51) Int. Cl.
*C10B 53/00* (2006.01)
*B03C 1/30* (2006.01)
(Continued)

(52) U.S. Cl.
CPC ................ *C10B 53/00* (2013.01); *B03C 1/30* (2013.01); *B09B 3/40* (2022.01); *C10G 1/00* (2013.01);
(Continued)

(58) Field of Classification Search
CPC ........... C10B 53/00; C10G 1/00; C22B 7/001; C22B 7/005; C22B 1/005; B09B 3/40; B03C 1/30
See application file for complete search history.

(56) References Cited

U.S. PATENT DOCUMENTS 6,084,139 A * 7/2000 Van Der Giessen ... C10B 53/02
                                                          201/2.5
6,178,899 B1 * 1/2001 Kaneko ................... F23G 5/006
                                                          110/235
(Continued)

FOREIGN PATENT DOCUMENTS

CN       204220600 U     3/2015
CN       105728434 A     7/2016
(Continued)

*Primary Examiner* — Jonathan Miller
(74) *Attorney, Agent, or Firm* — Leonid Kisselev

(57) ABSTRACT

A green resource-based method of thermal mass synergy in waste Integrated circuit board mainly includes carbonization cracking system, crushing and separation system, gasification cracking system and heat value utilization and comprehensive recovery system. Compared with existing techniques, carbonization cracking system can realize the dry distillation cracking of organic matter in waste integrated circuit board which converts carbon, hydrogen and other elements into fuel carbonized cracking gas and cracking oil, the heat from the combustion of the carbonization cracking gas of the invention provides the energy needed for the carbonization cracking to realize self-heating carbonization cracking. Carbonization cracking products are cracked and separated to solve the problems such as hard to break and (Continued)

organic coating metal caused by direct crushing and separation of traditional circuit boards which Improves crushing and separation effect; gasification cracking system achieves the comprehensive utilization of carbon, the gasified cracking gas can be used as a heat source for subsequent valuable metal recovery to further improve the utilization rate of calorific value. The invention has the characteristics of: high heat value utilization rate, low energy consumption, high metal recovery rate, short process recovery of valuable metal and no pollution of flue gas.

5 Claims, 1 Drawing Sheet

(51) Int. Cl.
*B09B 3/40* (2022.01)
*C10G 1/00* (2006.01)
*C22B 1/00* (2006.01)
*C22B 7/00* (2006.01)
*B09B 101/17* (2022.01)

(52) U.S. Cl.
CPC .............. *C22B 1/005* (2013.01); *C22B 7/001* (2013.01); *C22B 7/005* (2013.01); *B03C 2201/20* (2013.01); *B09B 2101/17* (2022.01); *C10G 2300/1003* (2013.01)

(56) References Cited

U.S. PATENT DOCUMENTS

| | | | | |
|---|---|---|---|---|
| 8,419,902 | B2* | 4/2013 | Feerer | F23G 5/02 |
| | | | | 48/119 |
| 9,816,033 | B2* | 11/2017 | Brandhorst, Jr. | C10B 47/44 |
| 2011/0308158 | A1* | 12/2011 | Pye | C10J 3/60 |
| | | | | 48/209 |
| 2016/0045841 | A1* | 2/2016 | Kaplan | C01B 32/05 |
| | | | | 429/49 |

FOREIGN PATENT DOCUMENTS

| | | |
|---|---|---|
| CN | 106345794 A | 1/2017 |
| CN | 106623340 A | 5/2017 |
| JP | 2005058868 A | 3/2005 |
| JP | 2012106182 A | 6/2012 |

* cited by examiner

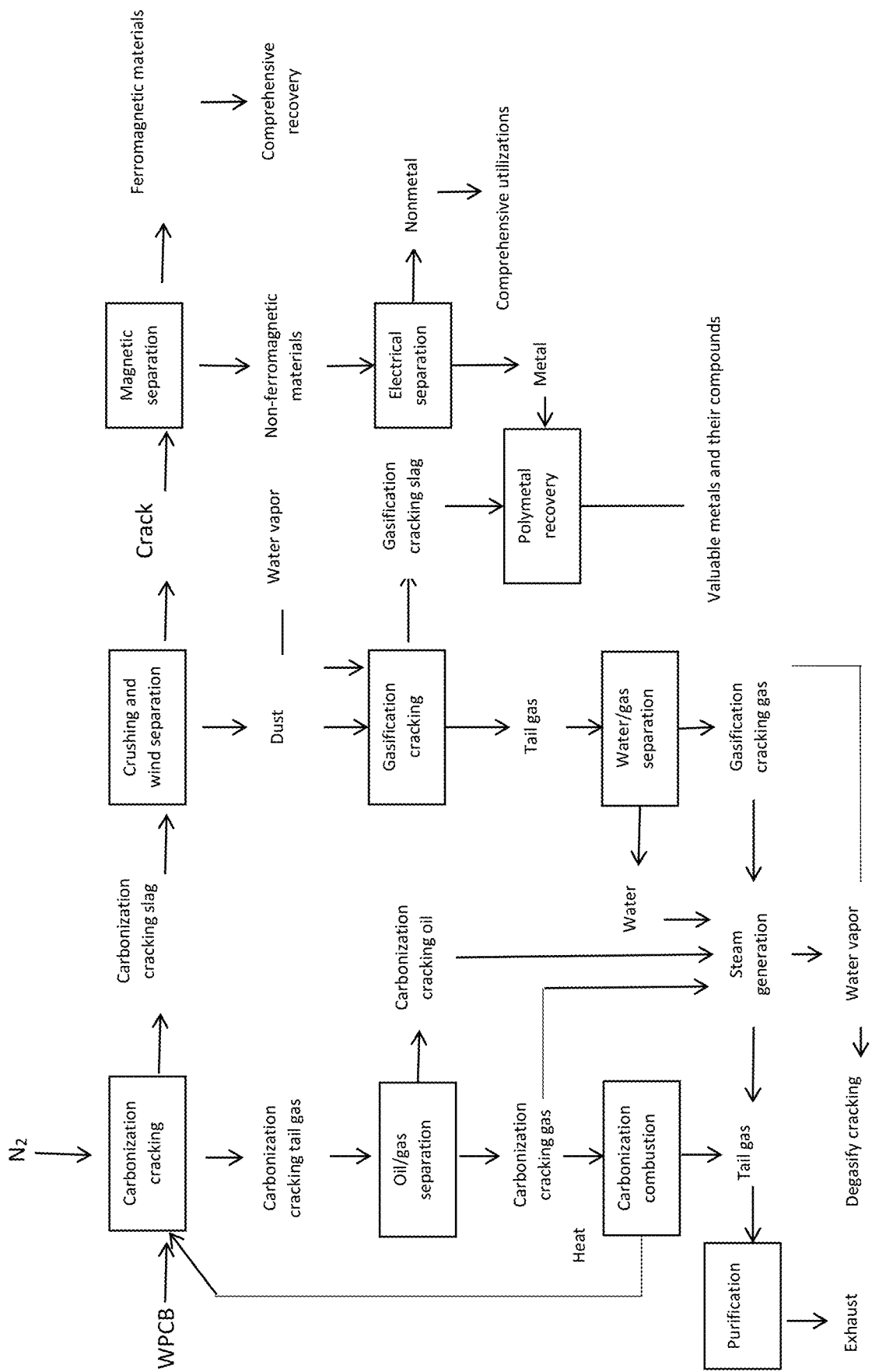

GREEN RESOURCE-GENERATING METHOD BASED ON THERMAL MASS SYNERGY OF WASTE INTEGRATED CIRCUIT BOARD

TECHNICAL FIELD

The present disclosure relates to a green resource-based method of thermal mass synergy in waste Integrated circuit board, especially relates to a green resource-based method of heat and valuable matter in waste Integrated circuit board by using carbonization cracking, gasification cracking, crushing separation and heat source utilization technologies.

BACKGROUND ART

Integrated circuit board plays an important role in electrical and electronic products which is the foundation of modern electrical and electronic industry. Integrated circuit board is mainly composed of electronic components, glass fiber reinforced epoxy resin and copper foil laminate consisting of many metallic materials including precious metals. Waste integrated circuit board (WPCB) contains a lot of valuable metals, such as gold, silver, palladium, etc., which is much higher than the original mineral deposits and has great recycling value. At the same time, WPCB has complex composition and contains a variety of harmful substances such as heavy metal and brominated flame retardant. Traditional recycling methods such as landfill and incineration will seriously damage the site of the ecosystem. Therefore, WPCB has the dual properties of resource and pollution.

At present, the domestic waste integrated circuit board mainly adopts the following methods for disposal:
(1) Cupola burning: this method belongs to the disposal method expressly prohibited by the government, which will bring huge environmental pollution and serious dioxin pollution.
(2) Aqua regia acidulation: this method is prohibited by the government, acid gas and waste liquid produced in the process of acidification will cause serious secondary pollution.
(3) Plasma cracking: the disposal method is in the experimental stage, the waste circuit board is cracked by plasma heating under vacuum or nitrogen protection. Organic matter is directly cracked and gasified to avoid dioxin production. At the same time, glass fiber and other non-metallic materials form non-metallic frits, and the alloy blocks obtained are directly sent to smelting and recycling. Since its high energy consumption, industrialization cannot be realized.
(4) Crushing and separation: this method is currently recommended for disposal by the government. Before crushing and separation, the electronic components of the waste integrated circuit board are removed, during the removal process, some technologies adopt the process of hot tin removal to recover part of tin at the same time. The bare board of components is removed and the separation of metal and non-metal in the circuit board is realized by crushing and separation. According to the difference of separation medium, separation can be divided into hydraulic separation, wind separation and electrostatic separation. Due to the special structure of organic-inorganic-metal of waste circuit board, adhesion, coating and incomplete stripping are easy to occur in the crushing process. Therefore, the metal recovery rate is about 95%, while the metal content of about 1% of the non-metallic powder (resin and glass fiber composite grinding) is also obtained. In terms of the content of bare metal is 20%, 10,000 tons of waste circuit board will produce 8,000 tons of non-metallic powder which belongs to hazardous waste and needs to be paid to relevant disposal enterprises for backfilling. The defects of this method are that the metal recovery rate is not high, the non-metallic powder produced cannot be used in high value, and subsequent hazardous waste disposal is needed.
(5) Collaborative smelting: this disposal method is the mainstream disposal method abroad, which combines the waste integrated circuit board with industrial wastes such as copper sludge for collaborative smelting. During the process, metal is enriched to form alloy for recovery and extraction, resin is used as fuel in the smelting, glass fiber and other non-metallic is treated as slag agent. The method has the advantages of strong processing capacity and light secondary pollution.

However, there is a high demand for collaborative smelting and flue gas treatment equipment, such large equipment is not available for industrial production currently.

In order to solve the problem of organic heat value utilization and crushing separation in waste integrated circuit board, the invention provides carbonization cracking technology to realize the cracking and carbonization of organic matter of circuit board. Carbon, hydrogen and other elements in organic matter are converted into fuel carbonized cracking oil and gas, which provide heat source after combustion to achieve self-heating carbonization cracking. Carbonized material is easy to break and separation due to the decomposition of organic matter which improves the metal recovery rate. Gasification cracking technology is adopted to further energize carbon and hydrogen and provide heat source for subsequent polymetallic recovery. The invention realizes thermal mass synergy of waste integrated circuit board, improves metal recovery rate, greatly reduces energy consumption and avoids secondary pollution.

SUMMARY

The purpose of the invention is to solve the problems of high heat value organic matter utilization and valuable metal comprehensive recovery of waste integrated circuit board. At the same time, the glass fiber and other inorganic substances in the integrated circuit board can be separated and comprehensively utilized, which has the characteristics of high recovery added value, low energy consumption, and standard exhaust emission.

The green resource-based method of thermal mass synergy in waste Integrated circuit board mainly includes the following technical parts:
(1) Carbonization cracking system: including carbonization cracking, oil/gas separation and carbonization combustion; carbonized cracking slag and tail gas is obtained through carbonization cracking of waste integrated circuit board, carbonized cracking gas and carbonized cracking oil are obtained by oil/gas separation, combustion tail gas and heat are obtained through carbonized combustion of carbonized cracking gas, and the heat generated directly provides heat source for carbonized cracking;
(2) Crushing and separation system: Including crushing air separation, magnetic separation, electrical separation; carbonized cracking slag obtained from the carbonized cracking is crushed and process air separation to obtain the crushed material and dust, then process magnetic separation of the crushed material to obtain ferromagnetic and non-ferromagnetic materials, non-ferromagnetic materials are electrically separated to obtain metal and non-metal, ferromagnetic materials and non-metal are used for comprehensive utilization respectively;
(3) Gasification cracking system: including gasification cracking and water/gas separation; dust is obtained after crushing and wind separation to process gasification cracking to obtain gasification cracking slag and tail gas, gasification cracking tail gas is separated by water gas separation to obtain water and gasification cracking gas.
(4) Heat value utilization and comprehensive recovery system: including steam generation, exhaust gas purification and polymetallic recovery process;
carbonized cracking oil, carbonized cracking gas and gasified cracking gas enter steam boiler for combustion to obtain combustion tail gas and steam, purify the combustion tail gas to meet the standard and discharge; steam provides heat source for gasification cracking and polymetallic recovery, the cracking slag obtained from gasification and the metals obtained from electrical separation are recycled into polymetal to obtain valuable metals and their compounds.

Further, in the carbonization cracking process of the carbonization cracking system, the partial oxygen pressure is controlled less than or equal to 6% and protected by nitrogen (i.e., the atmosphere is air and nitrogen, and the partial oxygen pressure is 6%), the carbonization cracking temperature is 400~700° C., and the carbonization cracking time is 1~3 hours; the crushing particle size is less than 100 mesh in the crushing air separation process of the crushing separation system; In gasification cracking process of gasification cracking system, the gasification cracking temperature is 700~950° C., the mass flow rate of steam/material is 0.5~1, and the gasification cracking time is 0.5~2 hours; In heat value utilization and comprehensive recovery system, the generated combustion tail gas is reburned and rapid cooling to ensure the emission of dioxins up to the standard.

Compared with the existing technology, carbonization cracking system can realize the dry distillation cracking of organic matter in waste integrated circuit board which converts carbon, hydrogen and other elements into fuel carbonized cracking gas and cracking oil, the heat from the combustion of the carbonization cracking gas of the invention provides the energy needed for the carbonization cracking to realize self-heating carbonization cracking. Carbonization cracking products are cracked and separated to solve the problems such as hard to break and organic coating metal caused by direct crushing and separation of traditional circuit boards which Improves crushing and separation effect; gasification cracking system achieves the comprehensive utilization of carbon, the gasified cracking gas can be used as a heat source for subsequent valuable metal recovery to further improve the utilization rate of calorific value.

The invention has the characteristics of: high heat value utilization rate, low energy consumption, high metal recovery rate, short process recovery of valuable metal and no pollution of flue gas.

BRIEF DESCRIPTION OF THE DRAWINGS

FIG. 1 shows the technical flow chart of green resource-based method of thermal mass synergy in waste Integrated circuit board.

DESCRIPTION OF THE PREFERRED EMBODIMENTS

Embodiment 1

Follow these Steps to Recycle:
(1) Carbonized cracking slag and tail gas is obtained through carbonization cracking of waste integrated circuit board, during the carbonization cracking process, the oxygen partial pressure was controlled at 6% with nitrogen protection, the carbonization cracking temperature was 400° C., and the carbonization cracking time is 1 hour. Carbonized cracking gas and carbonized cracking oil are obtained by oil/gas separation, combustion tail gas and heat are obtained through carbonized combustion of carbonized cracking gas, and the heat generated directly provides heat source for carbonized cracking.
(2) Carbonized cracking slag obtained from the carbonized cracking is crushed and process air separation to obtain the crushed material and dust, the crushing particle size is less than 100 mesh in the crushing air separation process; then process magnetic separation of the crushed material to obtain ferromagnetic and non-ferromagnetic materials, non-ferromagnetic materials are electrically separated to obtain metal and non-metal, ferromagnetic materials and non-metal are used for comprehensive utilization respectively;
(3) Dust is obtained after crushing and wind separation to process gasification cracking to obtain gasification cracking slag and tail gas, the gasification cracking temperature is 700° C., the mass flow rate of steam/material is 0.5, and the gasification cracking time is 0.5 hours; gasification cracking tail gas is separated by water gas separation to obtain water and gasification cracking gas;
(4) Carbonized cracking oil, carbonized cracking gas and gasified cracking gas enter steam boiler for combustion to obtain combustion tail gas and steam, purify the combustion tail gas to meet the standard and discharge; steam provides heat source for gasification cracking and polymetallic recovery, the cracking slag obtained from gasification and the metals obtained from electrical separation are recycled into polymetal to obtain valuable metals and their compounds.

The metal recovery is 99.2% and the concentration of flue gas dioxin is 0.08ngTEQ/m$^3$.

Embodiment 2

Follow these steps to recycle:
(1) Carbonized cracking slag and tail gas is obtained through carbonization cracking of waste integrated circuit board, during the carbonization cracking process, the oxygen partial pressure was controlled at 5% with nitrogen protection, the carbonization cracking temperature is 700° C., and the carbonization cracking time is 3 hour. Carbonized cracking gas and carbonized cracking oil are obtained by oil/gas separation, combustion tail gas and heat are obtained through carbonized combustion of carbonized cracking gas, and the heat generated directly provides heat source for carbonized cracking.
(2) Carbonized cracking slag obtained from the carbonized cracking is crushed and process air separation to obtain the crushed material and dust, the crushing particle size is less than 100 mesh in the crushing air separation process; then process magnetic separation of the crushed material to obtain ferromagnetic and non-ferromagnetic materials, non-ferromagnetic materials are electrically separated to obtain metal and non-metal, ferromagnetic materials and non-metal are used for comprehensive utilization respectively;
(3) Dust is obtained after crushing and wind separation to process gasification cracking to obtain gasification cracking slag and tail gas, the gasification cracking temperature is 950° C., the mass flow rate of steam/material is 1, and the gasification cracking time is 2 hours; gasification cracking tail gas is separated by water gas separation to obtain water and gasification cracking gas;
(4) Carbonized cracking oil, carbonized cracking gas and gasified cracking gas enter steam boiler for combustion to obtain combustion tail gas and steam, purify the combustion tail gas to meet the standard and discharge; steam provides heat source for gasification cracking and polymetallic recovery, the cracking slag obtained from gasification and the metals obtained from electrical separation are recycled into polymetal to obtain valuable metals and their compounds.

The metal recovery is 99.5% and the concentration of flue gas dioxin is 0.11ngTEQ/m$^3$.

Embodiment 3

Follow these steps to recycle:
(1) Carbonized cracking slag and tail gas is obtained through carbonization cracking of waste integrated circuit board, during the carbonization cracking process, the oxygen partial pressure was controlled at 3% with nitrogen protection, the carbonization cracking temperature is 450° C., and the carbonization cracking time is 2 hour. Carbonized cracking gas and carbonized cracking oil are obtained by oil/gas separation, combustion tail gas and heat are obtained through carbonized combustion of carbonized cracking gas, and the heat generated directly provides heat source for carbonized cracking.
(2) Carbonized cracking slag obtained from the carbonized cracking is crushed and process air separation to obtain the crushed material and dust, the crushing particle size is less than 100 mesh in the crushing air separation process; then process magnetic separation of the crushed material to obtain ferromagnetic and non-ferromagnetic materials, non-ferromagnetic materials are electrically separated to obtain metal and non-metal, ferromagnetic materials and non-metal are used for comprehensive utilization respectively;
(3) Dust is obtained after crushing and wind separation to process gasification cracking to obtain gasification cracking slag and tail gas, the gasification cracking temperature is 850° C., the mass flow rate of steam/material is 0.6, and the gasification cracking time is 1 hours; gasification cracking tail gas is separated by water gas separation to obtain water and gasification cracking gas;
(4) Carbonized cracking oil, carbonized cracking gas and gasified cracking gas enter steam boiler for combustion to obtain combustion tail gas and steam, purify the combustion tail gas to meet the standard and discharge; steam provides heat source for gasification cracking and polymetallic recovery, the cracking slag obtained from gasification and the metals obtained from electrical separation are recycled into polymetal to obtain valuable metals and their compounds.

The metal recovery is 98.8% and the concentration of flue gas dioxin is 0.09ngTEQ/m$^3$.

Embodiment 4

Follow these steps to recycle:
(1) Carbonized cracking slag and tail gas is obtained through carbonization cracking of waste integrated circuit board, during the carbonization cracking process, the oxygen partial pressure was controlled at 3% with nitrogen protection, the carbonization cracking temperature is 600° C., and the carbonization cracking time is 1.5 hour. Carbonized cracking gas and carbonized cracking oil are obtained by oil/gas separation, combustion tail gas and heat are obtained through carbonized combustion of carbonized cracking gas, and the heat generated directly provides heat source for carbonized cracking.
(2) Carbonized cracking slag obtained from the carbonized cracking is crushed and process air separation to obtain the crushed material and dust, the crushing particle size is less than 100 mesh in the crushing air separation process; then process magnetic separation of the crushed material to obtain ferromagnetic and non-ferromagnetic materials, non-ferromagnetic materials are electrically separated to obtain metal and non-metal, ferromagnetic materials and non-metal are used for comprehensive utilization respectively;
(3) Dust is obtained after crushing and wind separation to process gasification cracking to obtain gasification cracking slag and tail gas, the gasification cracking temperature is 750° C., the mass flow rate of steam/material is 0.8, and the gasification cracking time is 1.5 hours; gasification cracking tail gas is separated by water gas separation to obtain water and gasification cracking gas;
(4) Carbonized cracking oil, carbonized cracking gas and gasified cracking gas enter steam boiler for combustion to obtain combustion tail gas and steam, purify the combustion tail gas to meet the standard and discharge; steam provides heat source for gasification cracking and polymetallic recovery, the cracking slag obtained from gasification and the metals obtained from electrical separation are recycled into polymetal to obtain valuable metals and their compounds.

The metal recovery is 99.1% and the concentration of flue gas dioxin is 0.06ngTEQ/m$^3$.

Embodiment 5

Follow these steps to recycle:
(1) Carbonized cracking slag and tail gas is obtained through carbonization cracking of waste integrated circuit board, during the carbonization cracking process, the oxygen partial pressure was controlled at 2% with nitrogen protection, the carbonization cracking temperature is 650° C., and the carbonization cracking time is 2 hour. Carbonized cracking gas and carbonized cracking oil are obtained by oil/gas separation, combustion tail gas and heat are obtained through carbonized combustion of carbonized cracking gas, and the heat generated directly provides heat source for carbonized cracking.
(2) Carbonized cracking slag obtained from the carbonized cracking is crushed and process air separation to obtain the crushed material and dust, the crushing particle size is less than 100 mesh in the crushing air separation process; then process magnetic separation of the crushed material to obtain ferromagnetic and non-ferromagnetic materials, non-ferromagnetic materials are electrically separated to obtain metal and non-metal, ferromagnetic materials and non-metal are used for comprehensive utilization respectively;

(3) Dust is obtained after crushing and wind separation to process gasification cracking to obtain gasification cracking slag and tail gas, the gasification cracking temperature is 800° C., the mass flow rate of steam/material is 0.75, and the gasification cracking time is 2 hours; gasification cracking tail gas is separated by water gas separation to obtain water and gasification cracking gas;

(4) Carbonized cracking oil, carbonized cracking gas and gasified cracking gas enter steam boiler for combustion to obtain combustion tail gas and steam, purify the combustion tail gas to meet the standard and discharge; steam provides heat source for gasification cracking and polymetallic recovery, the cracking slag obtained from gasification and the metals obtained from electrical separation are recycled into polymetal to obtain valuable metals and their compounds.

The metal recovery is 99.6% and the concentration of flue gas dioxin is $0.15 ngTEQ/m^3$.

Embodiment 6

Follow these steps to recycle:

(1) Carbonized cracking slag and tail gas is obtained through carbonization cracking of waste integrated circuit board, during the carbonization cracking process, the oxygen partial pressure was controlled at 5.5% with nitrogen protection, the carbonization cracking temperature is 550° C., and the carbonization cracking time is 1 hour. Carbonized cracking gas and carbonized cracking oil are obtained by oil/gas separation, combustion tail gas and heat are obtained through carbonized combustion of carbonized cracking gas, and the heat generated directly provides heat source for carbonized cracking.

(2) Carbonized cracking slag obtained from the carbonized cracking is crushed and process air separation to obtain the crushed material and dust, the crushing particle size is less than 100 mesh in the crushing air separation process; then process magnetic separation of the crushed material to obtain ferromagnetic and non-ferromagnetic materials, non-ferromagnetic materials are electrically separated to obtain metal and non-metal, ferromagnetic materials and non-metal are used for comprehensive utilization respectively;

(3) Dust is obtained after crushing and wind separation to process gasification cracking to obtain gasification cracking slag and tail gas, the gasification cracking temperature is 950° C., the mass flow rate of steam/material is 0.5, and the gasification cracking time is 2 hours; gasification cracking tail gas is separated by water gas separation to obtain water and gasification cracking gas;

(4) Carbonized cracking oil, carbonized cracking gas and gasified cracking gas enter steam boiler for combustion to obtain combustion tail gas and steam, purify the combustion tail gas to meet the standard and discharge; steam provides heat source for gasification cracking and polymetallic recovery, the cracking slag obtained from gasification and the metals obtained from electrical separation are recycled into polymetal to obtain valuable metals and their compounds.

The metal recovery is 99.3% and the concentration of flue gas dioxin is $0.07 ngTEQ/m^3$.

What is claimed is:

1. A green resource-generating method based on thermal mass synergy in waste Integrated circuit board, comprising the steps of:
   (1) carbonization cracking, comprising:
      obtaining a carbonized cracking slag and a carbonized cracking tail gas through carbonization cracking of waste integrated circuit board;
      obtaining a carbonized cracking gas and a carbonized cracking oil by oil/gas separation of the carbonized cracking tail gas; and
      producing a combustion tail gas and heat by carbonized combustion of the carbonized cracking gas, wherein the heat generated is used directly to provide a heat source for the carbonized cracking of the waste integrated circuit board;
   (2) crushing and sorting, comprising:
      crushing by physical force the carbonized cracking slag obtained from the carbonized cracking of the waste integrated circuit board;
      obtaining crushed material and dust by air sifting the crushed carbonized cracking slag;
      separating the crushed material into ferromagnetic materials and non-ferromagnetic materials by magnetic separation;
      electrically sorting the non-ferromagnetic materials to obtain metals and a non-metal; and
      assigning the ferromagnetic materials and the non-metal for comprehensive recovering;
   (3) gasification cracking, comprising:
      subjecting the dust obtained from the crushing and air sifting to a gasification cracking process to obtain a gasification cracking slag and a gasification cracking tail gas; and
      separating the gasification cracking tail gas into water and gasification cracking gas by water gas separation;
   (4) comprehensively recovering heat and materials, comprising:
      using the carbonized cracking oil, the carbonized cracking gas and the gasification cracking gas to generate steam and combustion tail gas by combusting in a boiler;
      purifying the combustion tail gas to meet an environmental standard and discharge the purified combustion tail gas; and
      recovering the gasification cracking slag and the metals obtained from electrical sorting by recycling into polymetal to obtain precious metals and metal compounds, wherein the steam from the boiler is used as a heat source for the gasification cracking step and as a heating source in the step of recovering the gasification cracking slag and the metals.

2. A method according to claim 1, wherein the carbonization cracking of the waste integrated circuit board is performed by: providing a carbonization cracking system, wherein the carbonization cracking is performed under a Nitrogen and oxygen mixture with a partial oxygen pressure less than or equal to 6%, the carbonization cracking temperature is 400-700° C., and the carbonization cracking duration is 1~3 hours.

3. A method according to claim 1, wherein sizes of particles from the crushed material and the dust are less than 100 mesh in the crushing and air sifting process.

4. A method according to claim 1, wherein during the gasification cracking process, the gasification cracking temperature is 700-950° C., the mass flow rate of steam/material is 0.5~1, and the gasification cracking duration is 0.5~2 hours.

5. A method according to claim 1, further comprising: during the comprehensively recovering heat and materials step, the combustion tail gas is reburned and rapidly cooled to ensure the emission level of dioxins is within the environmental standard.

* * * * *